US012712300B1

(12) United States Patent
Jimenez-Salazar et al.

(10) Patent No.: US 12,712,300 B1
(45) Date of Patent: Aug. 18, 2026

(54) SNAP-TYPE ELECTRIC MULTI-SIGNAL CONCENTRIC CONNECTOR SYSTEM

(71) Applicants: Luis Alejandro Jimenez-Salazar, Moultonborough, NH (US); Shawn Alan Chase, Belmont, NH (US)

(72) Inventors: Luis Alejandro Jimenez-Salazar, Moultonborough, NH (US); Shawn Alan Chase, Belmont, NH (US)

( * ) Notice: Subject to any disclaimer, the term of this patent is extended or adjusted under 35 U.S.C. 154(b) by 30 days.

(21) Appl. No.: 19/177,504

(22) Filed: Apr. 12, 2025

(51) Int. Cl.
*H01R 12/71* (2011.01)
*H01R 13/52* (2006.01)
*H01R 13/627* (2006.01)
*H01R 13/6581* (2011.01)

(52) U.S. Cl.
CPC ....... *H01R 12/716* (2013.01); *H01R 13/6271* (2013.01); *H01R 13/5205* (2013.01); *H01R 13/6581* (2013.01)

(58) Field of Classification Search
CPC .............. H01R 12/716; H01R 13/6271; H01R 13/5205; H01R 13/6581
USPC .................................. 439/65, 18, 20, 21, 22
See application file for complete search history.

(56) References Cited

U.S. PATENT DOCUMENTS 7,802,995 B2 * 9/2010 Lai ......................... H01R 35/02 439/21
8,142,200 B2 * 3/2012 Crunkilton .............. A61N 7/02 439/21

* cited by examiner

*Primary Examiner* — Tulsidas C Patel
*Assistant Examiner* — Jeffrey Mountain

(57) ABSTRACT

The invention relates to a modular connector system for printed circuit boards (PCBs) and cables, comprising male and female disks with spring-loaded pogo pins and concentric conductive rings to enable reliable multi-signal transmission. The system is enclosed in snap-fit assemblies that provide secure connections without requiring precise alignment, maintaining signal integrity even under rotational movement. It is compatible with both surface-mount technology (SMT) and through-hole soldering methods.

15 Claims, 18 Drawing Sheets

SNAP-TYPE ELECTRIC MULTI-SIGNAL CONCENTRIC CONNECTOR SYSTEM

FIELD OF THE INVENTION

The present invention relates to electrical connectors, particularly for use in printed circuit boards (PCBs) and cable connections for multi-signal transmission applications

BACKGROUND OF THE INVENTION

Conventional electrical connectors require precise alignment between male and female components, which can limit their usability in applications with vibration or rotational movement. The present invention addresses these challenges by providing a reliable connector system that does not require precise alignment and maintains signal integrity in dynamic environments.

The demand for modularity in modern electronic systems has led to a need for compact, reliable connector designs that facilitate seamless connections without requiring precise visual alignment of male and female components. Current connector designs often necessitate specific positional alignment, which can be cumbersome and time-consuming in practical applications. Additionally, many existing connectors struggle to maintain signal integrity when subjected to rotational or vibrational forces, limiting their effectiveness in dynamic environments.

SUMMARY OF THE INVENTION

The Snap-Type Electric Multi-Signal Concentric Connector System is an innovative, versatile connector system designed for printed circuit boards (PCBs) and cables. It enables reliable multi-signal transmission without requiring precise alignment between male and female components, maintaining signal integrity even when subjected to rotational misalignment or vibration. This makes it particularly suited for modern compact electronics, such as wearables, where reliable connections for power, data transfer, and charging are essential.

The system consists of two main components:

1. Male Disk: A circular disk featuring spring-loaded pins arranged in an optimized pattern to minimize connector size while maintaining efficient signal transmission.
2. Female Disk: A corresponding circular disk with concentric conductive rings that ensure correct signal contact regardless of rotational position.

Both disks are housed within snap-fit assemblies that securely "click" together, maintaining the optimal distance for the spring-loaded pins to make reliable contact with the concentric rings. This mechanism draws inspiration from the simplicity and reliability of garment snaps, where components can be connected without precise visual alignment but remain securely attached until intentionally released.

The connector system supports multi-signal transmission, handling various signal types, including constant voltage, ground, high-frequency communication bits, and signals from sensors or antennas with varying impedance. Optional shielding can be incorporated to protect signal integrity in high-noise environments, as the edge of both disks provide an additional signal.

The design ensures compatibility with Surface Mount Technology (SMT) and Through-Hole soldering methods, sharing a unified footprint for easy integration. Additional plated throughholes surrounding and shearing the pin pattern and ring signals, allow for flexible assembly configurations, enabling connections between board-to-board, board-to-cable, or cable-to-cable setups.

To ensure secure attachment to PCBs or cable assemblies, the snap housings feature three alignment tips and three screw-ready ports. Each disk includes two non-conductive alignment holes for precise alignment during soldering and assembly, simplifying integration into electronic systems. This invention introduces two core functionalities:

1. Snap Functionality: A simple, reliable mechanism for easy connection and disconnection, ensuring a secure attachment.
2. Electric Multi-Signal Concentric Contact Functionality: A robust system where male spring-loaded pins (three or more) contact female concentric pads (two or more) in a space-efficient arrangement, maintaining positive and secure connections even under dynamic conditions such as rotation or vibration.

The Snap-Type Electric Multi-Signal Concentric Connector system bridges a gap in the market by offering a multi-contact snap-type connector that extends beyond existing single or dual-contact snap solutions, like medical electrode connectors. Its modular design, reliability, and flexibility to integrate with PBC boards and cables using screws, inserts and snap caps, to make it a powerful solution for modern electronic systems requiring dependable, compact, and versatile connections.

DETAILED DESCRIPTION OF THE INVENTION

The present disclosure relates to a connector system designed for use with printed circuit boards (PCBs) and cables, enabling reliable multi-signal transmission without requiring precise alignment between male and female components. This system maintains signal integrity even when the connectors rotate freely or are subjected to vibration.

The system consists of four main components:

1. Male Disk (1): Composed of a multilayer PCB with a set of spring-loaded pins (2) arranged in a specific pattern to minimize connector size.
2. Female Disk (8): Also made of a multilayer PCB, with concentric rings that ensure reliable contact with the spring-loaded pins from the Male Disk (1).
3. Male Snap (10): A housing for the Male Disk (1).
4. Female Snap (18): A housing for the Female Disk (8).

Spring-Loaded Pins (2), commonly known as POGO pins, are widely used in electronics for repeated connections and disconnections, offering reliable connectivity for data, power, and signals. They are well-suited for compact devices such as smartphones and wearables. These pins come in various mounting options, including Surface Mount Technology (SMT), ThroughHole (TH), Press-Fit (PF), and High-Current (HC). Available in diameters from 0.5 mm to 4 mm and heights from 1.5 mm to 10 mm, pogo pins have both compressed and uncompressed states, with recommended working windows for optimal performance. Common plating options include gold, nickel, and palladium, which ensure low contact resistance and high durability.

When integrating pogo pins with multilayer PCBs, adherence to IPC standards is critical. These standards ensure signal integrity, reliability, and manufacturability. For instance, proper PCB stack-up, which includes signal, ground, and power layers, helps minimize electromagnetic interference (EMI). Landing pads for pogo pins should be gold-plated or use Electroless Nickel Immersion Gold (ENIG) for durability and conductivity. Additionally, controlled impedance environments for high-speed signals should be maintained using transmission lines on outer layers with a ground reference.

The goal of this invention is to introduce a Snap-Type Electric Multi-Signal Concentric Connector System, suitable for various applications, from miniature connectors to high-current, large-scale connectors. The system can be implemented in different scales depending on pogo pin size and PCB thickness, without compromising the Snap functionality or the Electric Multi-Signals Concentric Contact functionality.

Figure 1:
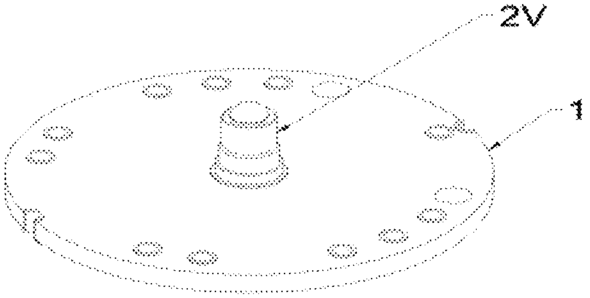
FIG. 1: Perspective view of a Male Disk (1) with a single pogo pin (2V) at the center.
Figure 2:
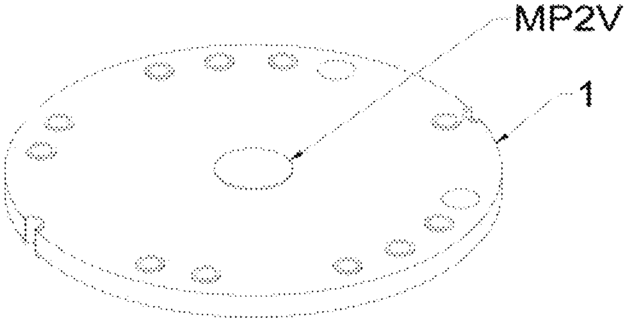
FIG. 2: Perspective view of a Male Disk (1) with a mounting pad (MP2V) for pogo pin (2V).
Figure 3:
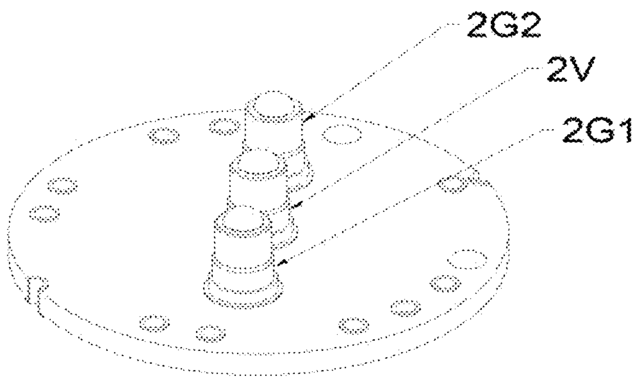
FIG. 3: Perspective view of a Male Disk (1) with three pogo pins: a central pogo pin (2V), and two additional pogo pins (2G1, 2G2) in a linear arrangement.
Figure 4:
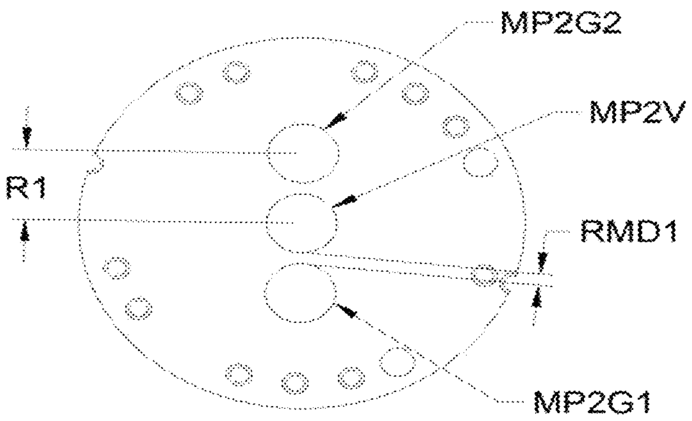
FIG. 4: Perspective view of a Male Disk (1) with three mounting pads (MP2V, MP2G1, MP2G2), showing the distance (R1) between their centers and separation by a distance (RMD1) between their edges.

Design and Assembly Steps for the 4 System Components:

Male PCB Disk (1):

1. Select the appropriate pogo pin (2) for the application.
2. Position one pogo pin (2V) at the center of the Male PCB Disk (1) and define its mounting pad (MP2V) based on the pogo pin type (SMT, Through-Hole, Press-Fit). (Refer to FIG. 1 and FIG. 2).
3. Place two additional pogo pins (2G1) and (2G2) symmetrically around the central pogo pin, forming a linear pattern at the recommended minimum distance (RMD1). Defining the radius (R1) as the distance from the center of the central pogo pin to the center of the adjacent pins. (Refer to FIG. 3 and FIG. 4).

Figure 5:
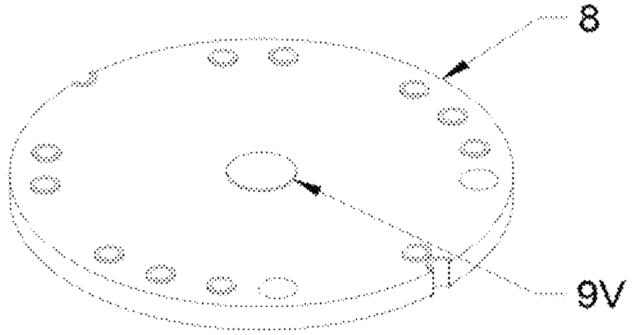
FIG. 5: Perspective view of a Female Disk (8) with a center circular pad (9V).
Figure 6:
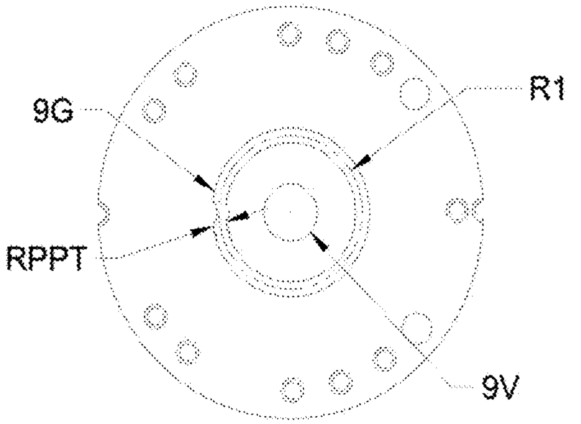
FIG. 6: Perspective view of a Female Disk (8) showing a center circular pad (9V) and a concentric ring pad (9G), with a radius (R1) from the center of the circular pad (9V) to the center of the ring pad (9G), and the thickness of the ring (9G) defined as (RPPT=T1).
Figure 7:
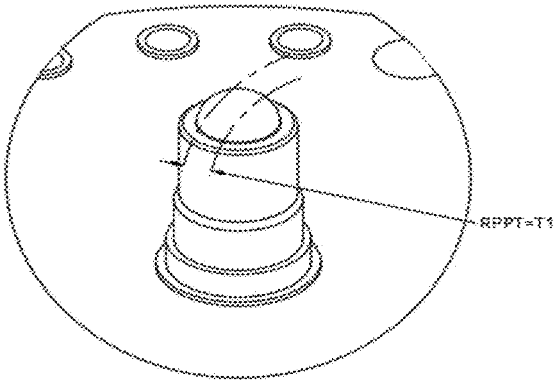
FIG. 7: Perspective view of a Male Disk (1) showing the pogo pin (2V) and the radius of its contact tip head (RPPT), defined as (T1).
Figure 8:
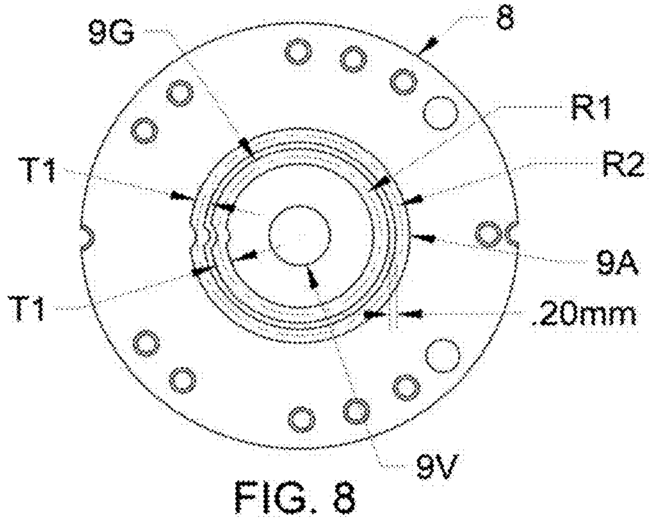
FIG. 8: Top view of a Female Disk (8) showing a center circular pad (9V) and two concentric ring pads: a concentric ring (9G) with a radius (R1) from the center of the pad (9V) to the center of the ring (9G) and thickness (T1), and a second concentric ring (9A) with a radius (R2) and thickness (T1). The rings (9G) and (9A) are separated by 0.20 mm.

Female PCB Disk (8):

1. Define a circular pad (9V) at the center of the Female PCB Disk (8) that matches the diameter of the pogo pin used on the Male PCB Disk (1). (Refer to FIG. 5).
2. Create a concentric ring (9G) with radius (R1) and thickness (T1), matching the pogo pin tip's radius (RPPT=T1). (Refer to FIG. 6 and FIG. 7).
3. Add a second concentric ring (9A) with thickness (T1) and a 0.20 mm separation (a safe distance between PCB traces in general) from the outer edge of ring (9G), yielding radius (R2). (Refer to FIG. 8).

Figure 9:
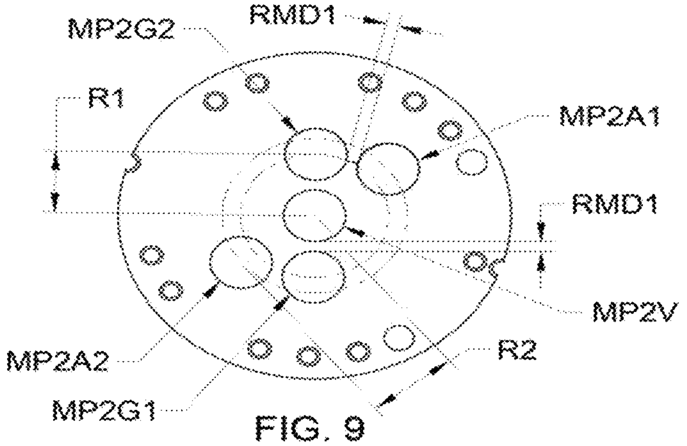
FIG. 9: Top view of a Male Disk (1) showing the mounting pads from FIG. 4, with two additional pads (MP2A1, MP2A2) positioned at a radius (R2) and separated by a distance (RMD1) between their edges.

Male PCB Disk (1):

4. Add two more pogo pin mounting pads (MP2A1) and (MP2A2) at radius (R2), ensuring separation from the previous mounting pads by (RMD1). (Refer to FIG. 9).

Figure 10:
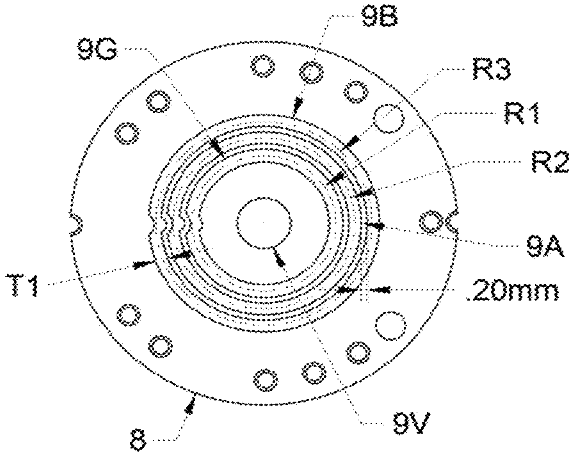
FIG. 10: Top view of a Female Disk (8) showing concentric ring pads from FIG. 8, adding a third concentric ring pad (9B) with radius (R3) and thickness (T1).

Female PCB Disk (8):

4. Add a third concentric ring (9B) with thickness (T1) and a 0.20 mm separation from ring (9A), creating radius (R3). (Refer to FIG. 10).

Figure 11:
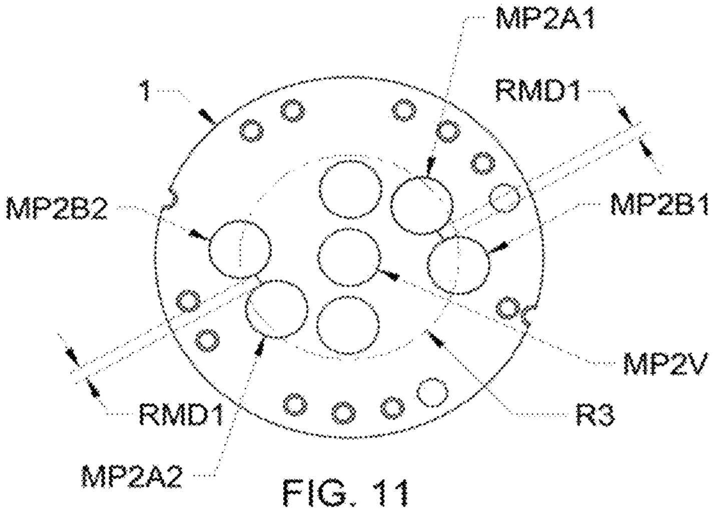
FIG. 11: Top view of a Male Disk (1) showing the mounting pads from FIG. 9, adding two more pads (MP2B1, MP2B2) positioned at a radius (R3) and separated by (RMD1).

Male PCB Disk (1):

5. Add two additional pogo pin mounting pads (MP2B1) and (MP2B2) at radius (R3) with separation (RMD1). (Refer to FIG. 11).

Figure 12:
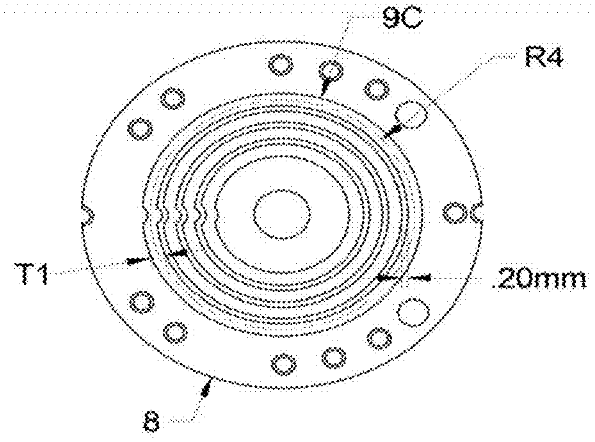
FIG. 12: Top view of a Female Disk (8) showing concentric ring pads from FIG. 10, adding a fourth concentric ring pad (9C) with radius (R4) and thickness (T1).

Female PCB Disk (8):

5. Add a fourth concentric ring (9C) with thickness (T1) and a 0.20 mm separation from ring (9B), creating radius (R4). (Refer to FIG. 12).

Figure 13:
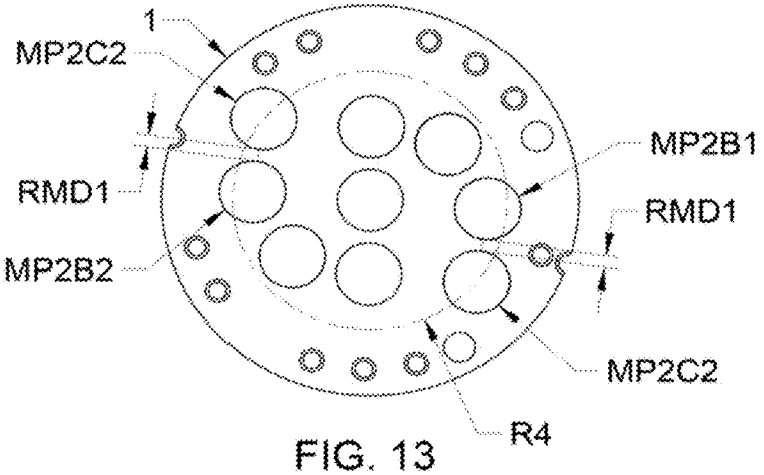
FIG. 13: Top view of a Male Disk (1) showing the mounting pads from FIG. 11, adding two more pads (MP2C1, MP2C2) positioned at a radius (R4) and separated by (RMD1).

Male PCB Disk (1):

6. Add two more pogo pin mounting pads (MP2C1) and (MP2C2) at radius (R4) with separation (RMD1). (Refer to FIG. 13).

This design methodology can be extended for more signals.

Figure 14:
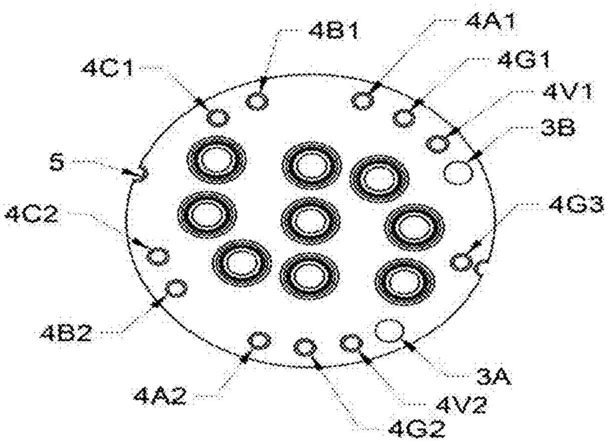
FIG. 14: Top view of the Male Disk composed of a main PCB body with nine springloaded pins, showing 11 signal ports (4C1, 4B1, 4A1, 4G1, 4V1, 4G3, 4V2, 4G2, 4A2, 4B2, and 4C2), two alignment holes (3B and 3A), and a metallized shielding edge(S).
Figure 15:
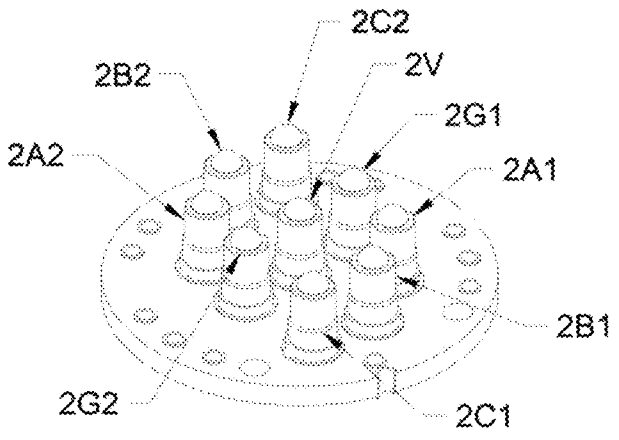
FIG. 15: Perspective view of the Male Disk top, showing the main PCB body and the nine spring-loaded pins.
Figure 16:
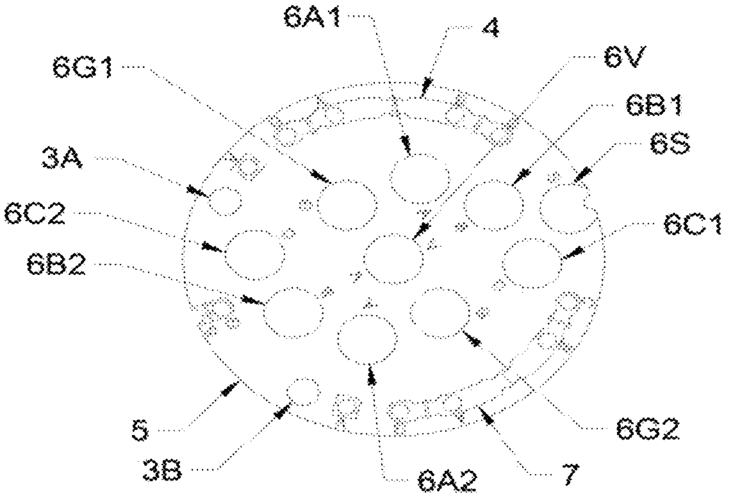
FIG. 16: Perspective view of the Male Disk bottom, showing the footprint and jumper options.
Figure 17:
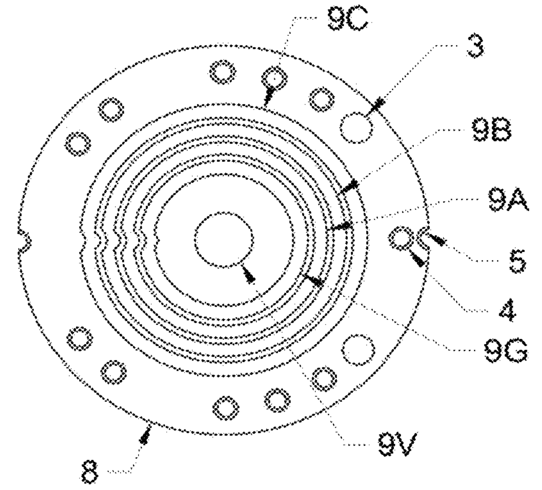
FIG. 17: Top view of the Female Disk, composed of a main PCB body with five concentric circles, showing the 11 signal ports, the two alignment holes, and a metallized shielding edge.
Figure 18:
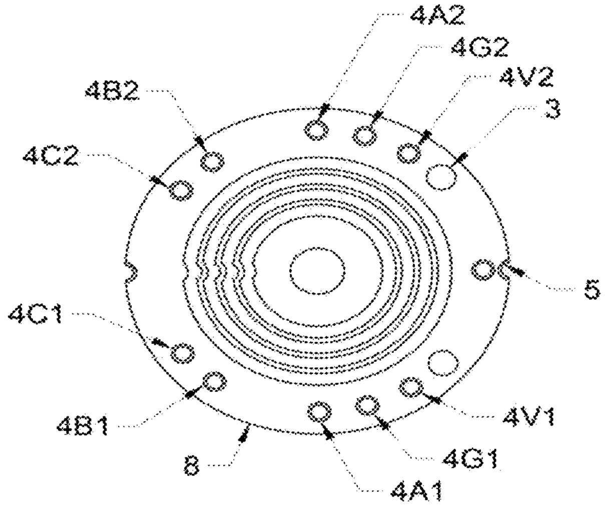
FIG. 18: Perspective view of the Female Disk top, showing the main PCB body.
Figure 19:
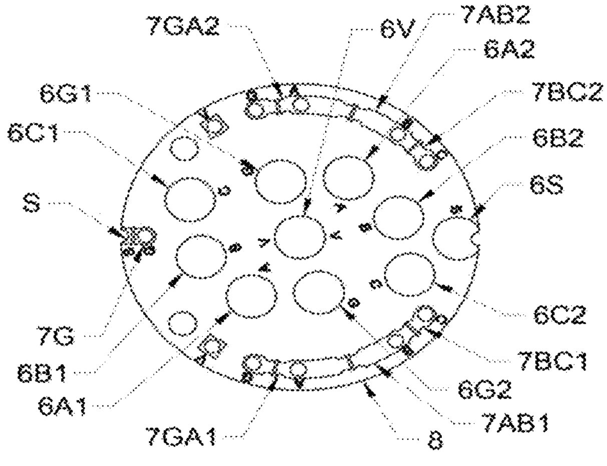
FIG. 19: Perspective view of the Female Disk bottom, showing the footprint and jumper options.
Figure 20:
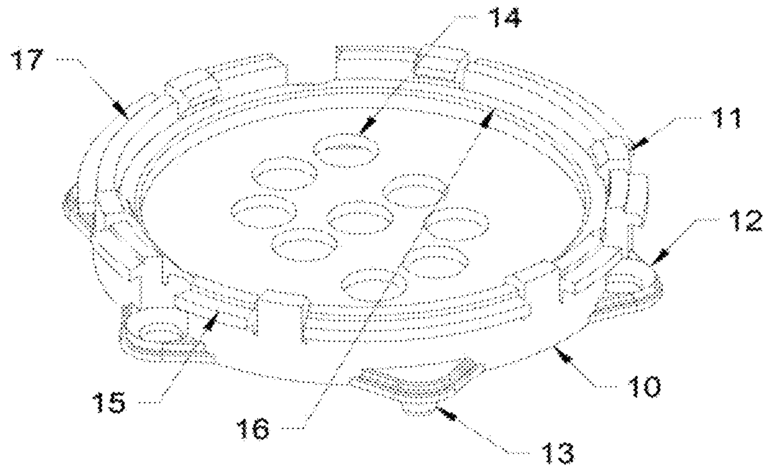
FIG. 20: Perspective view of the Male Snap body, showing the main body with six flexible clips, three screw ports, three alignment pins, nine holes for the Male Disk's nine springloaded pins, an internal shoulder, a top shoulder for the Female Snap body, and a shoulder for a cover plate.
Figure 21:
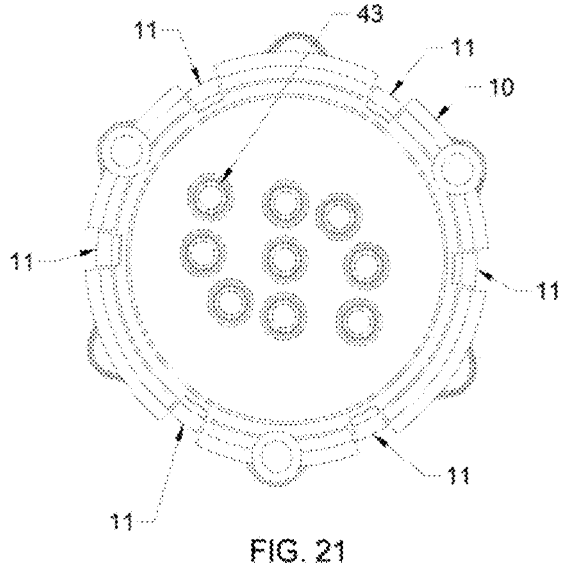
FIG. 21: Top view of the Male Snap body enclosing the assembled Male Disk PCB.
Figure 22:
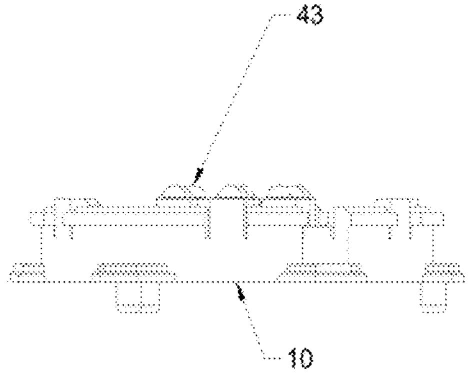
FIG. 22: Lateral view of the Male Snap body enclosing the assembled Male Disk PCB.
Figure 23:
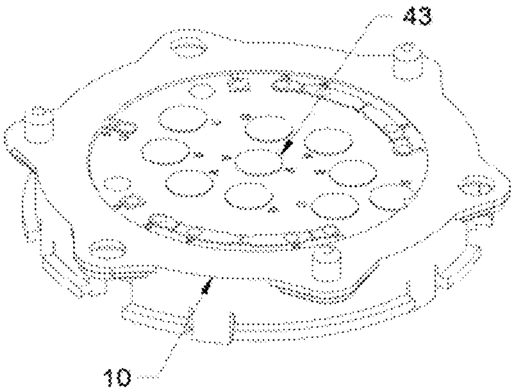
FIG. 23: Perspective view of the bottom of the Male Snap body enclosing the assembled Male Disk PCB.
Figure 24:
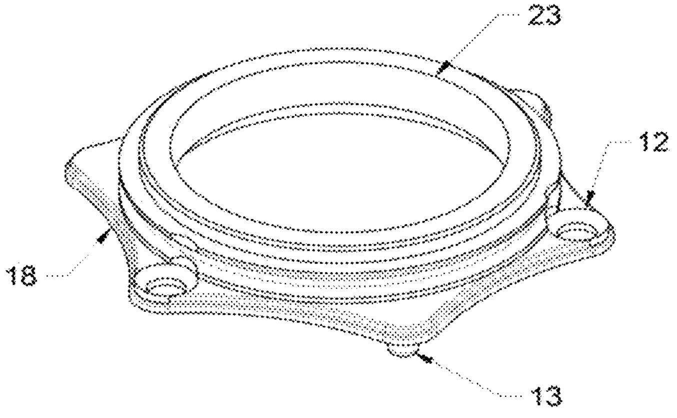
FIG. 24: Perspective view of the Female Snap body, showing the main body with three screw ports, three alignment pins, an opening for the Female Disk's concentric circles, a top shoulder, and an external shoulder for precise alignment with the Male Snap body. It also includes an external shoulder for a cover plate and a recessed belt area to accommodate the six flexible clips of the Male Snap body.
Figure 25:
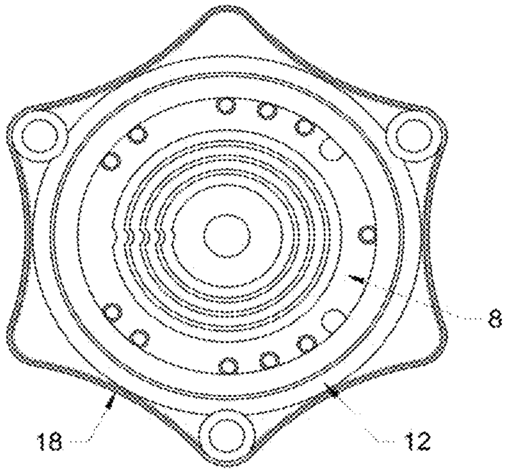
FIG. 25: Top view of the Female Snap body enclosing the Female Disk PCB.
Figure 26:
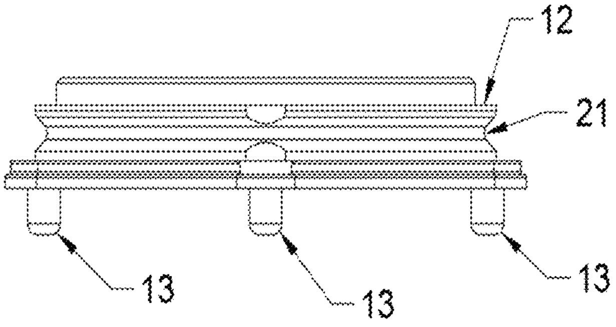
FIG. 26: Lateral view of the Female Snap body, showing the belt area accommodating the six flexible clips of the Male Snap body.
Figure 27:
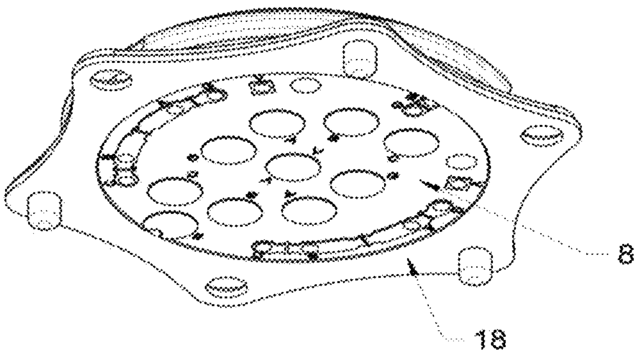
FIG. 27: Perspective view showing the bottom of the Female Snap body enclosing the Female Disk PCB.
Figure 28:
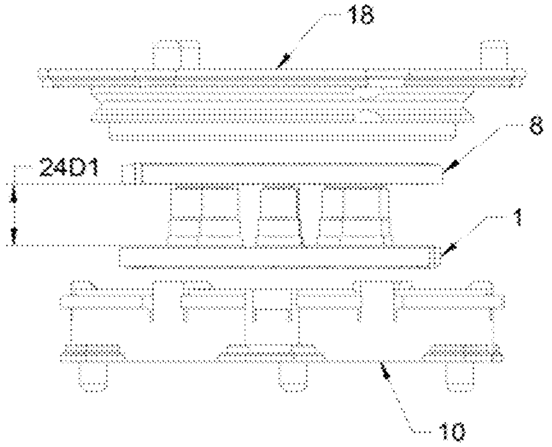
FIG. 28: Lateral view of the assembled Male Snap body, enclosing the Male Disk, interlocked with the Female Snap body enclosing the Female Disk.
Figure 29:
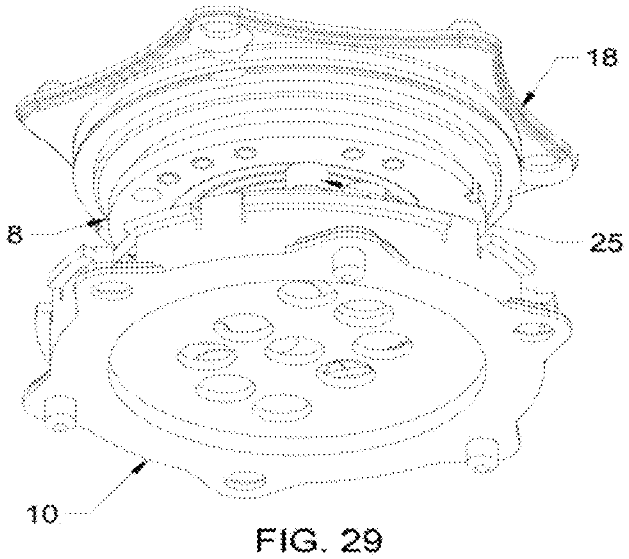
FIG. 29: Bottom perspective view showing the assembled Male Snap body, enclosing the Male Disk, interlocked with the Female Snap body enclosing the Female Disk.
Figure 30:
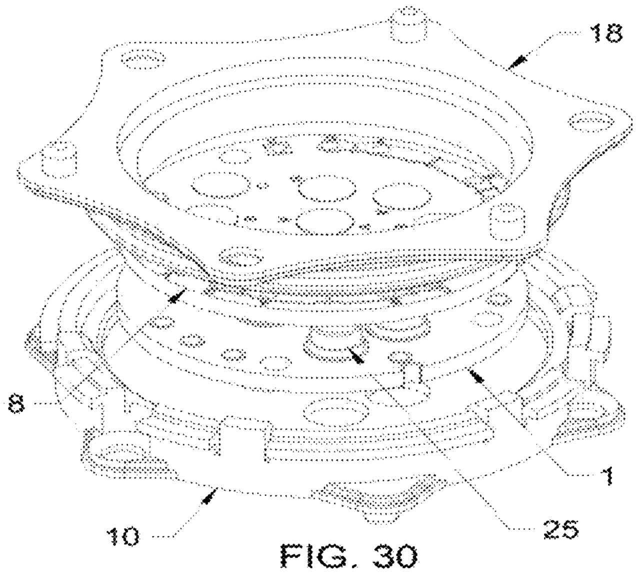
FIG. 30: Top perspective view of the assembled Male Snap body and Female Snap body, with their enclosed Male and Female Disks.
Figure 31:
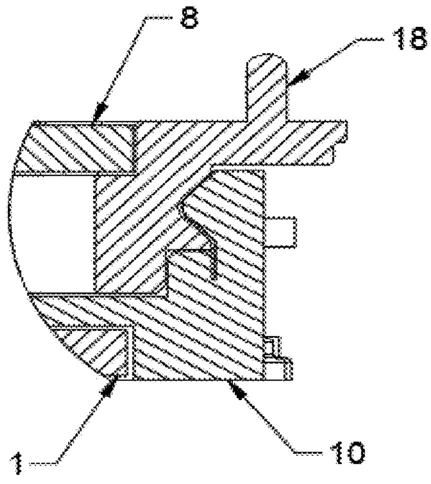
FIG. 31: Lateral view of the interlocked Male Snap body with the Female Snap body, detailing the Male Snap body flexible clips inside the Female Snap body's belt area.
Figure 49:
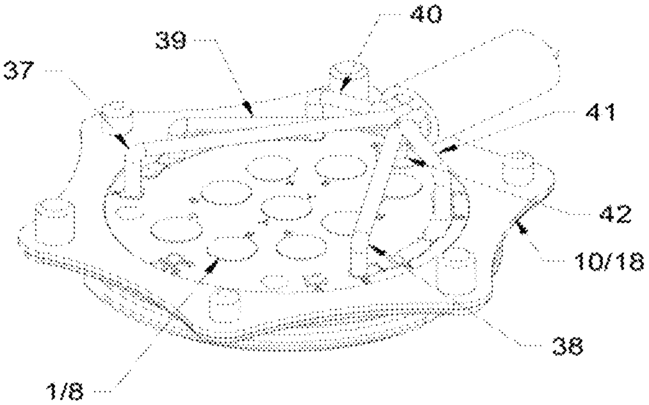
FIG. 49: Top view of a Male or Female Disk inside a Snap body, showing soldered cables for each signal.

Additional Design Considerations for Both Male (1) and Female (8) Disks:

7. Disks Footprint and Signal Ports: The signals from the Male spring-loaded POGO pins (2V, 2G1, 2G2, 2A1, 2A2, 2B1, 2B2, 2C1, 2C2) (Refer to FIG. 15) and the Female PCB Disks' concentric rings (9, 9G, 9A, 9B, 9C) (Refer to FIG. 17) need to be transferred to the connected body, typically a PCB or a cable. For a PCB-to-PCB assembly, there are two main soldering methods: SMT (Surface Mount Technology) or TH (Through-Hole) soldering. Both methods are supported. Using SMT pads (6V, 6G1, 6G2, 6A1, 6A2, 6B1, 6B2, 6C1, 6C2) defines the Disk's footprint (Refer to FIG. 16 and FIG. 19). A symmetric double-port array of TH plated holes (4V1, 4V2, 4G1, 4G2, 4A1, 4A2, 4B1, 4B2, 4C1, 4C2) allows for pin or wire soldering to assemble both PCBs (Refer to FIG. 14 and FIG. 18). For PCB-to-CABLE assembly, a wire can be soldered to at least one of the ports for each signal (Refer to FIG. 49).
8. Alignment and Mounting Holes: Both Male and Female Disks feature a non-conductive 2-hole symmetric pattern (3A and 3B) for precise alignment, ensuring that the footprint pads and through-hole patterns are properly aligned during assembly. (Refer to FIG. 14, FIG. 16, and FIG. 17). For example, 1 mm diameter pins can be inserted into these holes for alignment during assembly. Afterward, the alignment elements can be removed.
9. Shielding Edge: An optional shielding edge (5) can be added to both Male and Female Disks for electromagnetic shielding if needed. (Refer to FIG. 14, FIG. 15, FIG. 17, and FIG. 18).
10. Jumpers on the Bottom Face: Additional functionality is provided through jumpers (7GA1, 7GA2, 7AB1, 7AB2, 7BC1, 7BC2, and 7GS), allowing adjacent signals (G, A, B, C) to be connected. A jumper can also connect G (usually Ground) to S (usually Shielding) if required. (Refer to FIG. 19).
11. Ground, Voltage, and Shielding Layers: Both Male and Female PCB Disks include internal layers for V (usually Voltage), G (usually Ground), and S (usually Shielding).

Male Snap (10): The Male Snap (10) is the housing for the assembled Male PCB Disk (43). It is designed to snap onto the Female Snap (18). It features at least six flexible Snap-Clips (11), three screw-ready mounting holes (12), three aligning mounting pins (13), a pattern of holes (14) corresponding to the spring-loaded pogo pins of the Male PCB Disk, a bottom plane (15), an internal shoulder (16) to mate with the Female Snap's internal top shoulder (19), and an external shoulder (17) for a faceplate resting area if required. (Refer to FIG. 20, FIG. 21, FIG. 22, and FIG. 23).

Female Snap (18): The Female Snap (18) houses the Female PCB Disk (8) and is designed to snap onto the Male Snap (10). It has a receiving ring (21) where the Male Snap-Clips (11) land when connected, three screw-ready mounting holes (12), three aligning mounting pins (13), a bottom shoulder (22) for a faceplate resting area (if required), and a circular opening to expose the concentric rings pattern (23). (Refer to FIG. 24, FIG. 25, FIG. 26, and FIG. 27).

Figure 32:
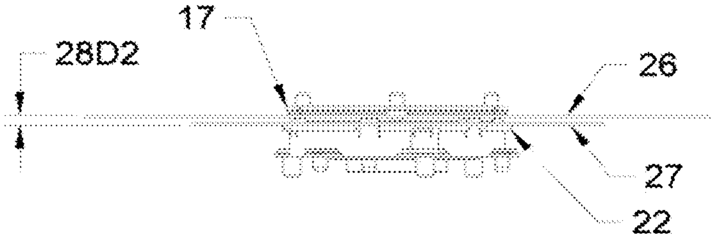
FIG. 32: Lateral view of a Female Snap assembly interlocked with a Male Snap assembly, showing both the Female and Male Snap cover plates.

Connecting a Male Snap (10) and a Female Snap (18):

When connecting the Male and Female Snaps, the distance between the top faces of the PCB Disks (24D1) is critical, as it must fall within the compressed operational window for the specific pogo pin used. The pogo pin tips (25) land in the center of the corresponding concentric rings. During assembly, the Snap components may rotate, and if constant circular motion is required, Omniball-style pogo pins with fully spherical tips are recommended. Additionally, ensure that the Male Snap Clips (11) fully engage the Female Receiving Ring (21). (Refer to FIG. 28, FIG. 29, FIG. 30, and FIG. 31). If faceplates are used (26, 27), ensure a space (28D2) between them when they rest on their respective faceplate shoulders (17, 22). (Refer to FIG. 32).

Figure 33:
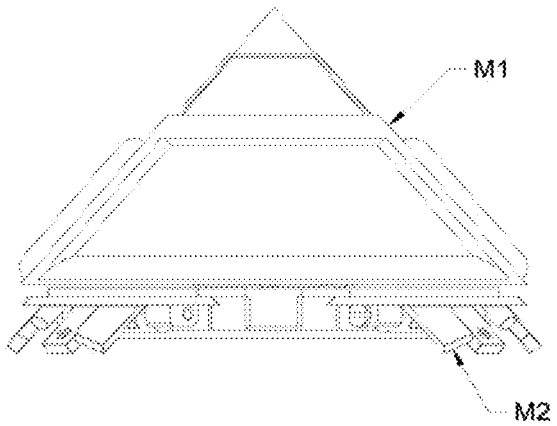
FIG. 33: Lateral view of a Female Snap assembly interlocked with a Male Snap assembly, showing a module M1 terminated with a Female Snap and cover plate, and a second module M2 terminated with a Male Snap and cover plate.
Figure 34:
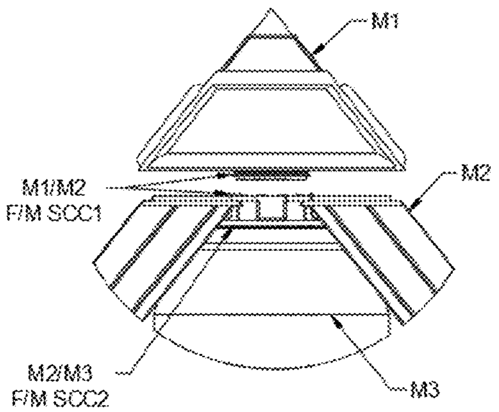
FIG. 34: Lateral view of three independent modules joined by two pairs of interlocked Male and Female Snap assemblies.

Modularity:

The Snap-Type Electric Multi-Signal Concentric Connector System is well-suited for internal PCB-to-PCB applications that do not require independent enclosures for each PCB. It is also ideal for modular designs where independent enclosures can be separated as needed. A Module (M1) can attach to another Module (M2), and more modules (M3, M4, etc.) can be attached as required. (Refer to FIG. 33 and FIG. 34).

Figure 35:
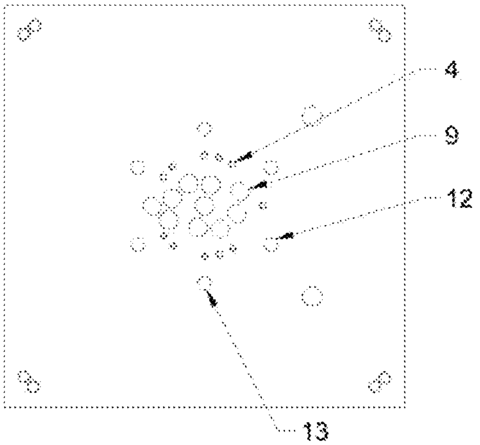
FIG. 35: Top view of a generic PCB designed to attach a Male or Female Snap body, showing the mirrored footprint for SMT soldering and the 11 plated-through holes for throughhole soldering. Also shows the six-hole pattern for the screw ports and alignment tips to secure the Snap bodies.
Figure 36:
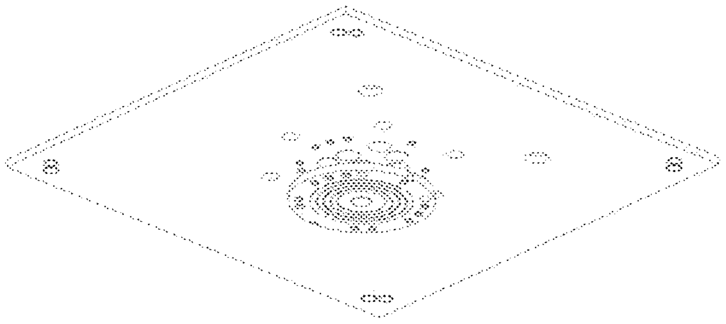
FIG. 36: Perspective view of a separated PCB and Female Disk.
Figure 37:
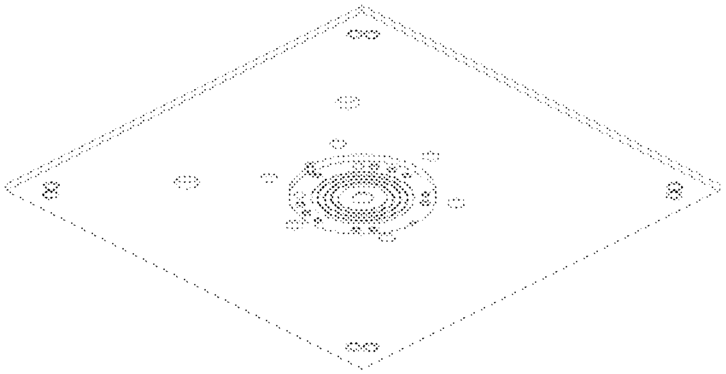
FIG. 37: Perspective view of an attached PCB and Female Disk.
Figure 38:
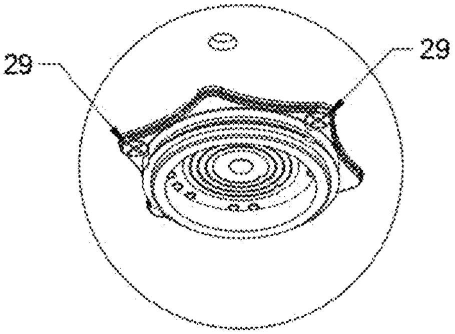
FIG. 38: Perspective view of a Snap Disk assembly attached securely with three screws.
Figure 39:
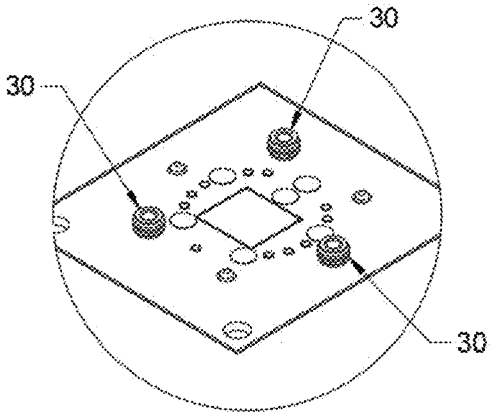
FIG. 39: Perspective view of a Snap Disk ready assembly with three threaded inserts.
Figure 40:
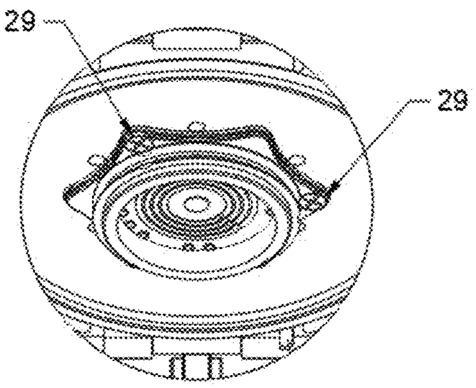
FIG. 40: Perspective view of a Snap Disk assembly attached with three screws into a solid threaded body.
Figure 41:
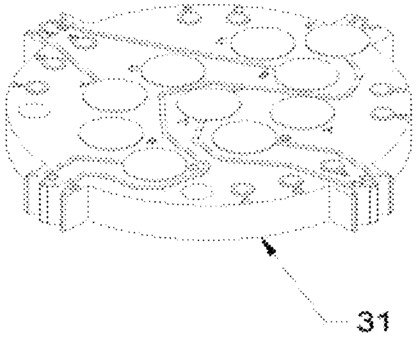
FIG. 41: Perspective top view of an Intermediate Disk PCB, showing the mirrored footprint for attaching a Male or Female Disk.
Figure 42:
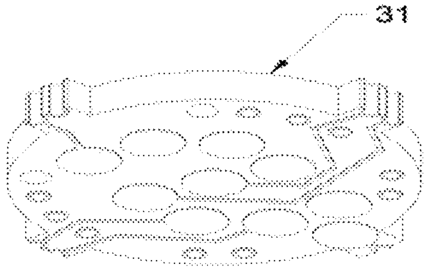
FIG. 42: Perspective bottom view of an Intermediate Disk PCB, showing the mirrored footprint for attaching a Male or Female Disk.
Figure 43:
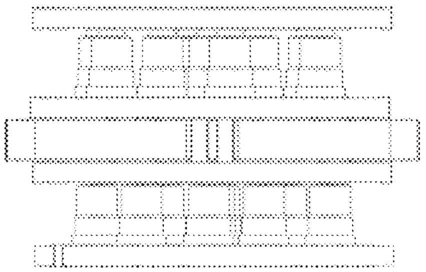
FIG. 43: Lateral view of an Intermediate Disk PCB with a Male Disk attached to its top face and a Female Disk attached to its bottom face, interlocked with a Female Snap assembly at the top and a Male Snap assembly at the bottom.
Figure 44:
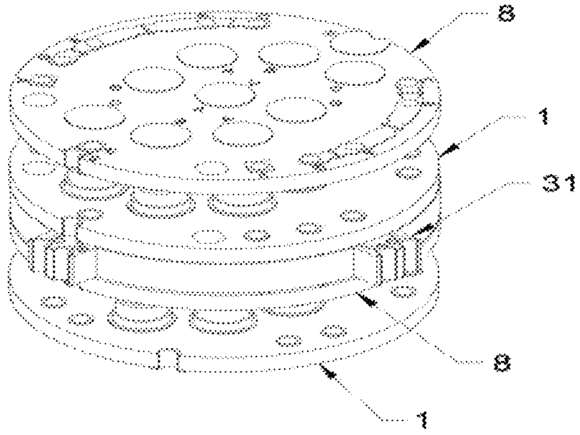
FIG. 44: Perspective view of an Intermediate Disk PCB with a Male Disk on the top and a Female Disk on the bottom, interlocked with both Male and Female Snap assemblies.

System Footprint:

To design a PCB compatible with this system, the footprint is the same for both Male and Female Snap Disk assemblies. The footprint includes SMT soldering pads (6), a symmetric TH double-port pattern for the signals (4), holes for the alignment pins (13), holes for the screws (12), and optional holes for the alignment PCB holes (3). (Refer to FIG. 35). The Disk can be aligned and attached using SMT or TH soldering methods. (Refer to FIG. 36 and FIG. 37). Once the Disk (1 or 8) is attached, the Snap (10 or 18) is mounted using screws (29) into threaded inserts (30) on the receiving PCB. (Refer to FIG. 38, FIG. 39, and FIG. 40).

Intermediate Disk:

To minimize the connection distance between three modules, an intermediate PCB Disk (31) can be designed with the system footprint on both sides. Signals can be transmitted from Male (1) to Female (8) and then to another Male (1) or Female (8). The signals would be available on the side connecting extensions of the Intermediate Disk (31) for another module. (Refer to FIG. 41, FIG. 42, FIG. 43, and FIG. 44).

Figure 45:
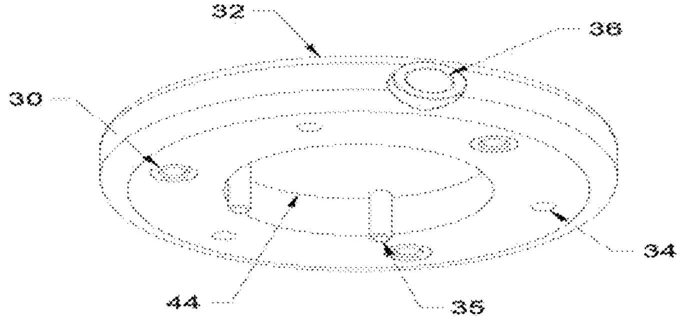
FIG. 45: Perspective bottom view of a Snap Cap used for cable connections.
Figure 46:
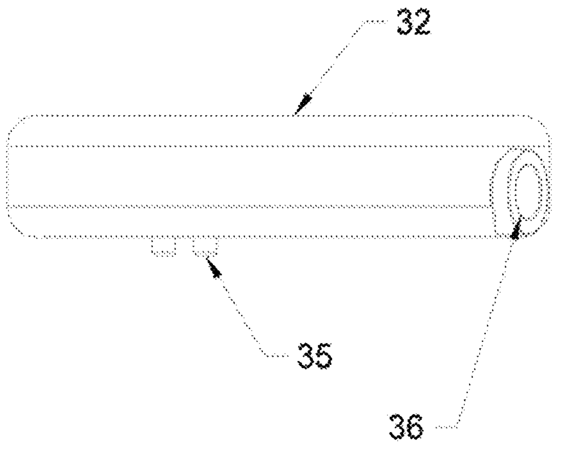
FIG. 46: Lateral view of the Snap Cap.

Cable Snap-Cap (32):

The Snap-Cap (32) is designed to provide secure connections for Snap-Type Electric MultiSignal Concentric Connector System cable applications. It accommodates either Snap-Male or Snap-Female assemblies. The Snap-Cap consists of a body (32), an internal chamber to accommodate signal cables (44), holes for threaded inserts (30), holes (34) for the Snap aligning pins (13), aligning posts (35) for the PCB Disks alignment holes (3), and a tunnel (36) for the carrier cable that contains the signal cables. (Refer to FIG. 45 and FIG. 46).

Figure 47:
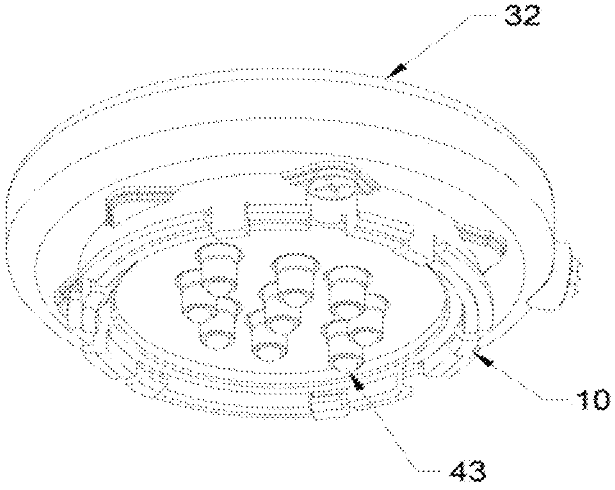
FIG. 47: Perspective bottom view of a Snap Cap with a Male Disk and Male Snap.
Figure 48:
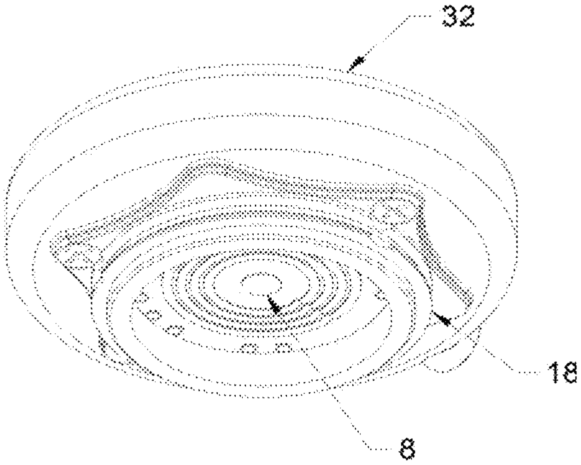
FIG. 48: Perspective bottom view of a Snap Cap with a Female Disk and Female Snap.
Figure 50:
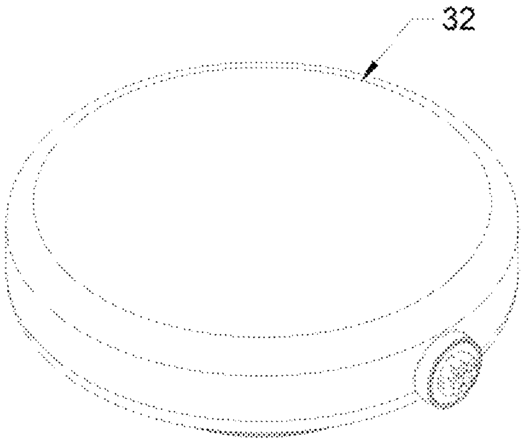
FIG. 50: Top view of an assembled Snap Cap showing cables connected to a multi-wire cable

The Snap-Cap (32) can accept a Male Snap (10) with an assembled Male Disk (43) or a Female Snap (8) with a Female Disk (18). (Refer to FIG. 47 and FIG. 48). To assemble a SnapType Electric Multi-Signal Concentric Connector System Cable, insert the carrier cable through the Snap-Cap tunnel (36), solder the tips of the signal cables (37, 38, 39, 40, 41, 42) to at least one of the corresponding PCB Disk signal ports (4V, 4G, 4A, 4B, 4C, S). Slide the carrier cable until the Snap aligning pins (13) and Snap-Cap posts (35) align with their respective mounting holes. Before closing, apply epoxy to fill the cable chamber (44), then close the assembly, insert screws (29), and allow the epoxy to cure, forming a reliable, solid assembly. (Refer to FIG. 49 and FIG. 50).

The system cables can be of different lengths and configurations, including Male to Male, Female to Female, Male to Female, and Male/Female to other standard connector types.

The invention claimed is:

1. A connector system, comprising: a male disk (1) composed of a multilayer printed circuit board (PCB) having a set of spring-loaded pins (2) arranged in a specific pattern to minimize connector size; a female disk (8) composed of a multilayer PCB having concentric rings configured to provide reliable contact with the spring-loaded pins (2) from the male disk (1); a male snap (10) housing for the male disk (1), the male snap (10) including flexible snap-clips (11) configured to secure to a female snap (18); a female snap (18) housing for the female disk (8), the female snap (18) including a receiving ring (21) configured to accept the flexible snap-clips (11) from the male snap (10); wherein the connector system is configured to maintain continuous electrical contact across multiple signal types, regardless of rotational orientation between the male disk (1) and the female disk (8).

2. The connector system of claim 1, wherein the spring-loaded pins (2) are pogo pins available in multiple configurations, including Surface Mount Technology (SMT), Through-Hole (TH), Press-Fit (PF), and High-Current (HC), with diameters ranging from 0.5 mm to 4 mm and heights from 1.5 mm to 10 mm.

3. The connector system of claim 2, wherein the pogo pins (2) are plated with materials such as gold, nickel, or palladium, ensuring low contact resistance and high durability, with the ability to maintain electrical signal integrity in conditions of rotation and vibration.

4. The connector system of claim 1, wherein the male disk (1) includes multiple pogo pin mounting pads (MP2V, MP2G1, MP2G2, MP2A1, MP2A2, MP2B1, MP2B2, MP2C1, MP2C2), symmetrically arranged in concentric patterns, ensuring reliable contact with the corresponding concentric rings on the female disk (8).

5. The connector system of claim 1, wherein the female disk (8) includes concentric rings (9V, 9G, 9A, 9B, 9C) with varying radii to ensure reliable electrical contact with the spring-loaded pogo pins (2) of the male disk (1).

6. The connector system of claim 1, wherein the system supports multi-signal transmission, allowing the transfer of various signal types, including power, ground, voltage, communication bits, and sensor data, across multiple concentric layers.

7. The connector system of claim 1, wherein the male snap (10) and female snap (18) housings are designed to allow rotational freedom between the male and female disks while maintaining continuous electrical contact through the pogo pins and concentric rings.

8. The connector system of claim 7, wherein the male snap (10) and female snap (18) are secured using flexible snap-clips (11) and a receiving ring (21), and further include screw-ready mounting holes (12) and aligning mounting pins (13) to secure the assembly to PCBs or other components.

9. The connector system of claim 1, wherein the male snap (1) and female disk (8) are designed with optional shielding edges (5) to provide electromagnetic interference (EMI) protection, with corresponding internal layers for voltage, ground, and shielding.

10. The connector system of claim 1, wherein the male and female disks include an internal jumper system for connecting adjacent signals (G, A, B, C, S) using jumper pads, enabling flexible configurations and signal connections.

11. The connector system of claim 1, further comprising: a cable snap cap (32) for securely connecting cables to the male or female snap assembly, wherein the snap cap includes an internal chamber to accommodate signal cables, holes for threaded inserts (30), and aligning posts (35) for proper alignment and connection of the snap assembly.

12. The connector system of claim 11, wherein the cable snap cap (32) allows for epoxy sealing to ensure a reliable, solid assembly of the connector system when used in cable applications.

13. The connector system of claim 1, wherein the connector system is modular, allowing multiple modules to be interconnected using the male and female snap assemblies, with support for applications requiring multiple modules connected.

14. The connector system of claim 1, wherein the male and female disks support both Surface Mount Technology (SMT) and Through-Hole (TH) soldering methods, allowing flexibility in the connection to PCBs or other components.

15. The connector system of claim 1, further comprising: an intermediate disk (31) designed to minimize the connection distance between multiple modules, enabling signal transmission through male and female disks on both sides of the intermediate disk.

* * * * *